March 2, 1971 B. C. SHAW ET AL Re. 27,078

RADIATION SURVEY TRAINING APPARATUS

Original Filed July 27, 1964 3 Sheets-Sheet 1

INVENTORS
BENJAMIN CHANDLER SHAW
HOWARD B. MORROW, JR.
BY Sellers & Latta
ATTORNEYS

RADIATION SURVEY TRAINING APPARATUS

Original Filed July 27, 1964 3 Sheets-Sheet 2

INVENTORS
BENJAMIN CHANDLER SHAW
HOWARD B. MORROW, JR.
BY Sellers & Laura
ATTORNEYS

RADIATION SURVEY TRAINING APPARATUS

Original Filed July 27, 1964 3 Sheets-Sheet 3

INVENTORS
BENJAMIN CHANDLER SHAW
HOWARD B. MORROW, JR.
BY Sellers & Latta
ATTORNEYS United States Patent Office Re. 27,078
Reissued Mar. 2, 1971

27,078

RADIATION SURVEY TRAINING APPARATUS

Benjamin Chandler Shaw, Granada Hills, and Howard B. Morrow, Jr., Burbank, Calif., assignors to Cook Engineering Company, Alexandria, Va.

Original No. 3,293,777, dated Dec. 27, 1966, Ser. No. 385,109, July 27, 1964. Application for reissue Dec. 23, 1968, Ser. No. 799,134
Int. Cl. G09b *9/00*
U.S. Cl. 35—1 21 Claims

Matter enclosed in heavy brackets [ ] appears in the original patent but forms no part of this reissue specification; matter printed in italics indicates the additions made by reissue.

This invention relates to training apparatus and has as its general object to provide a complete kit for performing field training exercises in radiological surveys for training operators in the use of radiation detecting equipment.

A principal object of the invention is to provide an apparatus which will be both safe and relatively inexpensive in its construction and use as compared to the dangers and the cost that would be involved in the production and detection of actual nuclear radiation. Accordingly, the invention provides a training apparatus which will simulate the conditions arising from a nuclear explosion and the detection of the resulting radiation.

In general, the invention utilizes a set of transmitting and receiving apparatus for the transmission and reception of high frequency radio waves simulating various types of nuclear radiation such as gamma *rays* [particles] and alpha particles.

Toward the attainment of the foregoing, the invention provides a training apparatus:

(1) Which is relatively compact and highly portable;

(2) Which is battery-operated and can therefore be set up and operated in remote areas and without the necessity for being attached to an external source of electric power;

(3) Embodying a transmitter having directional transmission such as to develop a characteristic elongated oval pattern simulating that of nuclear radiation fallout;

(4) Embodying a combination of transmitter and receiver so constructed and correlated in their operation that the received signals, as displayed on indicator apparatus, will simulate the indication of actual nuclear radiation as received by nuclear radiation detecting equipment.

(5) Embodying a transmitter which is adapted to transmit a series of nuclear radiation-simulating signals with a rise and fall in intensity corresponding to the rise and fall in the intensity of actual nuclear radiation resulting from a nuclear explosion;

(6) Adapted to transmit signals combining such rise and fall of intensity with a distribution of the signals in a pattern simulating a radiation fallout pattern;

(7) Embodying a transmitter having selector means for effecting any one of four transmitting operations, namely (1) under manual control, at a controllable signal intensity variation rate; (2) consisting of a stage of automatic rising variations of signal intensity at a linear rate; (3) consisting of a stage of automatic decay of signal intensity at an exponential rate; or (4) combining rise and decay stages in a continuous automatic operation;

(8) Embodying a transmitter having means for transmitting (in addition to its radiation-simulating signals) identification signals (e.g. "call letters") for identifying the user of the apparatus. Such identification can be in terms of the SCC-licensed call letters of a civilian defense licensee or a military unit having a military license;

(9) Utilizing solid-state elements in its circuitry, so as to attain maximum reliability and long trouble-free operation;

(10) Embodying mechanism for simulating the alpha particle radiation developed where an accident (without a nuclear explosion) occurs in the transportation of a nuclear war head, spilling nuclear material over a relatively small area (e.g. of 200 to 300 feet radius) resulting in what is commonly termed a "hot-spot" contamination which requires a decontamination operation in order to eliminate the radiation hazard. For this purpose, the apparatus includes a "hot-spot" transmitter, and a receiver correlated therewith so as to obtain a reception which simulates reception of actual alpha particles on an alpha particle detector instrument.

In general, the invention provides a kit embodying the following instruments:

(a) A main transmitter for simulating radiation from fallout debris of a nuclear explosion.

(b) An antenna for the main transmitter.

(c) One or more "hot-spot" transmitters for simulating radiation from nuclear material spilled from a nuclear warhead involved in an accident during transportation (in which a safety explosive device will blow the sections of nuclear material apart to prevent them from accidentally coming together in sufficient aggregate volume to trigger a nuclear explosion).

(d) Portable simulated radiacmeters (gamma receivers) and alpha counters.

(e) Accessories.

Other objects and advantages will become apparent in the ensuing specification and appended drawing in which.

Figure 1:
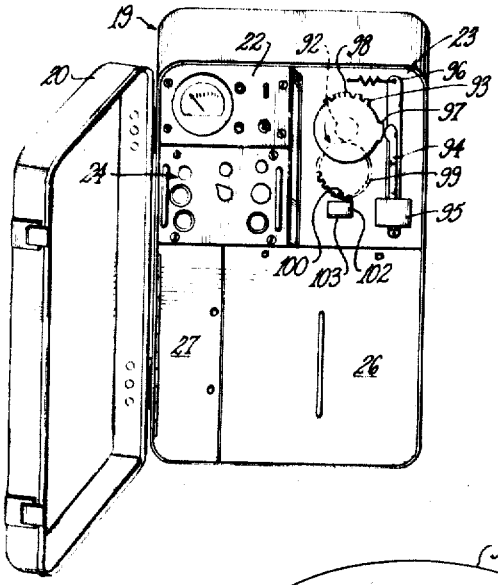
FIG. 1 is a perspective view of the main transmitter.
Figure 3:
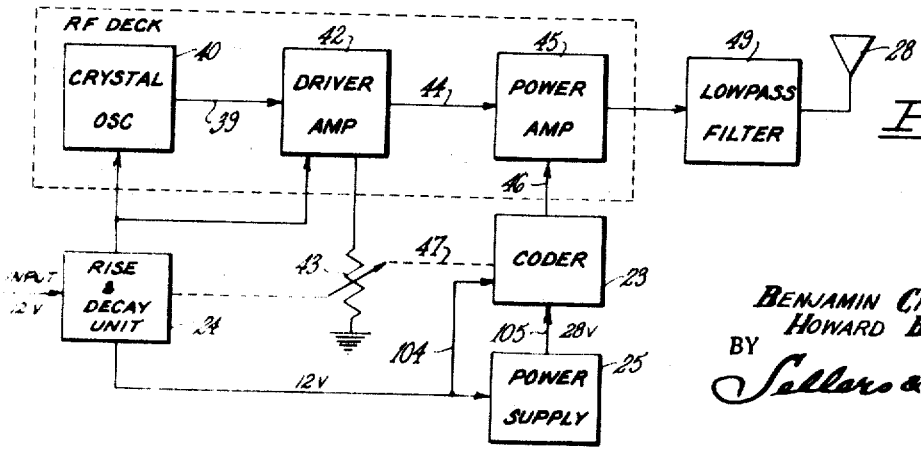
FIG. 3 is a block diagram of the main transmitter.

The main transmitter (FIGS. 1 and 3) comprises generally a portable apparatus provided with a casing 19 and a hinged cover 20 for closing the same to protect the apparatus from the elements etc.; a signal generating unit 22; an identification coder unit 23; a rise and decay unit 24; a power supply unit 25 (shown only in FIG. 3); a battery unit 26; and miscellaneous accessories such as attachment cords, cables, etc. Such accessories are contained in a compartment 27, and the units 23–26 are mounted within respective compartments which as seen in FIG. 1, are intended to designate the respective operative units schematically. Since some of these units are per se of conventional construction, they are not illustrated or described herein in detail, with the exception of the signal generator unit, the rise and decay unit, the receiver units, and the directional antenna, which are described in detail hereinafter.

Figure 5:
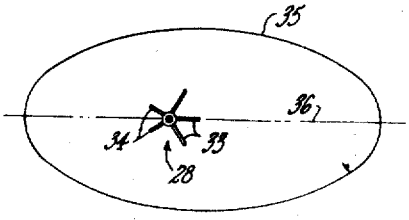
FIG. 5 is a diagram illustrating the simulated fallout pattern of wave-radiation by the main transmitter.

The transmitter delivers a signal to a directional antenna 28 which transmits in the fallout-simulating pattern shown in FIG. 5.

Figure 2:
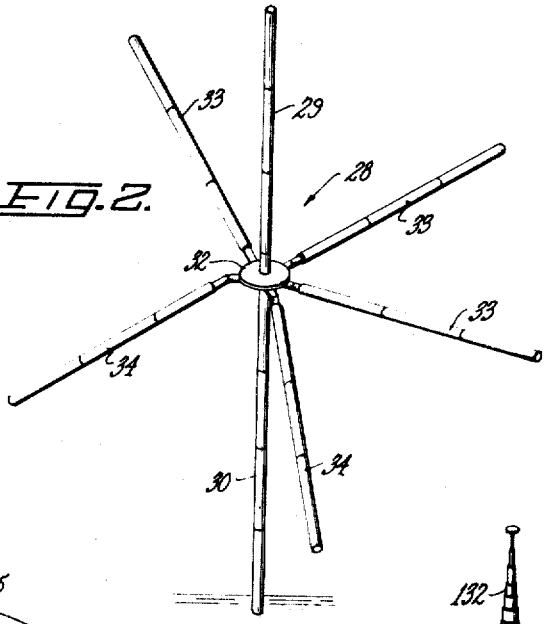
FIG. 2 is a perspective view of the special antenna for developing the radiation fall-out pattern.

The directional antenna 28 (FIG. 2) comprises a plurality of sections (largely tubular) which are assembled in the field and which include a mast section 30, a vertical radiator 29 superimposed upon the mast section 30 in axial alignment therewith; a hub 32 for coupling the vertical radiator 29 to the mast 30; three horizontal groundplane radials 33, disposed within a 180° sector of the circular area on one side of hub 32, and a pair of downwardly inclined radials 34 disposed within the sector on the opposite side of the hub. The five radials subtend equal angles as viewed in plan, approximately 72° apart.

In the operation of our improved antenna, the waves generated between the vertical radiator 29 and the ground plane defined by the three horizontal radials 33 are of greater intensity (because of the smaller angle 90° subtended between the vertical radiator and this plane) than the waves generated between the vertical radiator and the two downwardly inclined radials 34 (subtending an obtuse angle). The stronger waves are projected to a greater distance than the weaker waves, and consequently the transmission pattern is an ellipsoid as indicated at 35 in FIG. 5, the major axis 36 of the ellipsoid being aligned with the central radial of the horizontal group of radials 33. Despite the fact that the two lateral radials 33 extend more laterally than they do parallel to this major axis, the width of the pattern 35 is considerably less than its length along the major axis 36. The pattern satisfactorily resembles a fallout pattern developed by the resultant of vertical settling of radiation particles (from a nuclear explosion) and a prevailing air movement in a given direction.

The main transmitter components, in detail, are as follows:

The signal generator 22 (designated "RF DECK" in FIG. 3) comprises a crystal-controlled, transistorized oscillator 40 adapted to generate a radio-frequency oscillating current which is fed, as indicated by the signal-flow arrow 39, to a driver amplifier 42 adapted to have its power level varied by an external ultimate control device which is indicated schematically as a variable resistor at 43. The ultimate control device 43 constitutes a portion of the mechanism of the rise and decay unit 25, hereinafter described. The output of driver amplifier 42 is fed, as indicated by signal-flow arrow 44, to a power amplifier 45. The output of the power amplifier 45 is fed, as indicated by signal flow arrow 48, to a low pass filter 49 which functions to remove any undesirable harmonics or spurious emissions from the signal, and which transmits a filtered signal through a conductor 50 to the antenna 28.

The coder unit 23 (FIG. 3) functions to interrupt the operation of the power amplifier 45 in a selected interruption pattern (e.g. such as to transmit a code signal repeated three times and then stopped). The control from the coder 23 is transmitted to the power amplifier 45 through a circuit indicated schematically by the signal-flow arrow 46. The coder 23 not only controls the signal generator 22 but it also effects a control over the rise and decay unit 24, transmitting this control through a circuit indicated schematically by broken line 47. During such time as the coder is in operation, the circuit 47 disables the rise and decay unit 24 and causes the signal generator 22 to operate constantly at full power.

Coder unit 23 (FIG. 1) comprises a fractional horse power electric motor (not shown) driving a coding disc 90 and a gear pinion 92, the disc 90 having a plurality if peripheral actuator teeth 93 adapted to actuate a follower lever 94 of a normally open switch 95 which functions to transmit the coder control to the filter unit 49 of the main transmitter, effecting a "dot" pulse transmission when closed by a tooth 92. Disc 90 may also include a series of teeth 98 separated only by narrow saw cuts and collectively constituting a long tooth for transmission of a "dash" pulse. Disc 90 also includes a continuous raised section 97 on which the switch lever 94 rests when the coder is not in operation, so as to keep the line 46 to the power amplifier 45 closed (thereby keeping the amplifier 45 operative). When the switch lever 94 drops into a notch between teeth 93 or onto a low portion of the periphery of disc 90, it renders the amplifier 45 inoperative, the line 46 being an essential connection in the operating circuit of amplifier 45.

The coder further includes a release lever 96 on which the switch 95 and its actuator lever 94 are carried, the assembly of switch and the two levers being pivoted to the case as indicated. Release lever 96 is spring-loaded as indicated to yieldingly hold the switch lever 94 normally in yielding engagement with coder disc 90. The end of lever 96 is exposed for finger tip engagement to manually withdraw the lever and switch assembly away from the disc 90 for servicing operations (interchange of one coder disc by another). The coder disc as originally furnished to the customer has a circular periphery which is continuous except for a large number of the saw cuts extending throughout its circumference except for the continuous raised portion 95. The small segments between the saw cuts are then removed by the customer, leaving only those segments which become the dot teeth 93 and the dash teeth 98.

Gear pinion 92 drives a gear 99 which carries an actuator pin 100 engageable with a common actuator lever for a superimposed pair of normally closed switches 102, 103 so as to open both of them. This is the normal position of gear 99, in which the connection 47 from the coder unit to the rise and decay unit 24 is inoperative. When during the operation of the coder unit, the pin 100 orbits away from switch 102, the latter, which constitutes part of the disabling connection 47 between coder 23 and rise-decay unit 24, completes a circuit which shorts out the unit 24, rendering it inoperative. The gear ratio between drive pinion 92 and gear 99 is an integral ratio, a ratio of 1:3 being preferred though not essential.

Switch 103, when closed during the coder operation, establishes a holding circuit for the coder motor, continuing its operation through a cycle ending when the pin 100 returns to its normal position, reopening switch 103 and thus terminating the coder operation. The operation of the coder unit 23 is initiated manually by a push button switch, and it is powered by a connection 104 from power supply 25. Since the coder drive motor, its starting circuit and its holding circuit are of well known conventional circuitry, they are not shown in detail. In addition to the power connection 104 (12 volts) a 28 volt connection 105 is provided between the power supply 25 and the coder 23, for powering the 28 volt pulses generated by the coder and transmitted to the amplifier 45 for developing coding signals for radiation from antenna 28.

Rise and decay unit 24 provides for a linear rise in the power level of the signal output followed by an exponential decay in accordance with the decay properties of actual nuclear debris, where the apparatus is utilized for simulating the effect of a nuclear explosion. It is to be understood however that the invention is not necessarily restricted to such linear rise and exponential decay, but can be utilized to produce a rise and fall in power level having a rate-variation other than linear rise and exponential fall, to simulate other radiation conditions which may require monitoring.

Figure 7:
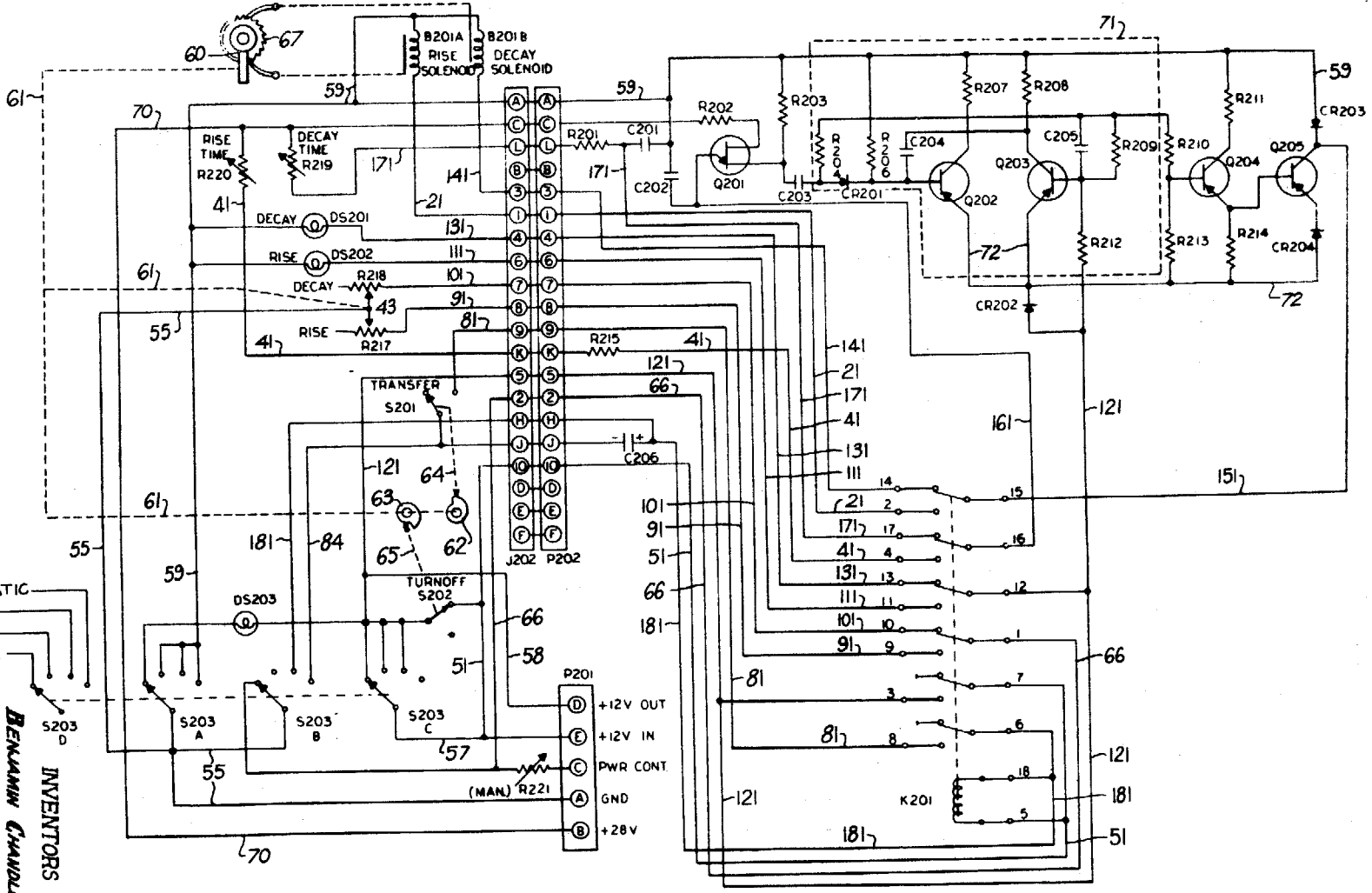
FIG. 7 is a schematic diagram of the rise-decay unit of the main transmitter.

In the particular apparatus disclosed herein, the rise and decay control is introduced into the circuit at the driver amplifier 42, although the invention contemplates the possibility of applying this control at other stages of the circuit (e.g. at the power amplifier 45). In detail, unit 24, as shown in FIG. 7, comprises the ultimate control unit 43 which transmits the control to the driver amplifier 42 and which consists of a rheostat R217 (transmitting the rise control) and a rheostat R218 (transmitting the decay control) in a combination unit in which the wipers of the two rheostats are carried by a single mount or are otherwise mechanically tied together for movement in unison over their respective resistor elements, as indicated by the common connection between the two arrows indicating the wipers and to a conductor 55 extending to the control unit 43 from a ground connection designated GND. The same ground connection is applied to the wipers of two sections of a four-section manually operated gang type selector switch S203, the four sections of which are designated by this reference character coupled with the respective letters A, B, C and D respectively. In the illustrated first position of this selector switch (providing for manual operation) the ground connection is extended to a manually operable rheostat R221, through which direct manual control can be exercised for effecting rise and fall of the power level in the driver amplifier 42 without the intervention of the automatic rise-decay mechanism which will presently be described. In this same position, the wiper of section A, on its first contact, will complete a circuit to an indicator light DS203 to indicate that the apparatus is set for manual control. Also in this first position, the wiper of section C, on its first contact, will complete the power circuit from the "in" terminal of a twelve volt power supply designated +12V IN through conductors 57 and 58 to a terminal designated +12V OUT from which the 12 volt current is supplied to the remainder of the circuit. At this point it may be noted that the rise-decay unit actually utilizes only three sections of the four section selector switch, the fourth section, D being dead and being shown merely for the purpose of labeling the four positions of the selector switch, the manual position (just described) being labelled "manual" at the section D.

In the second position of the selector switch, the circuit is adjusted for automatic decay operation (without automatic rise), this being designated simply "decay" at section D. In this position, the wiper of section A, on its second contact, will establish a connection between ground conductor 55 and a conductor 59 which applies ground to all of the remaining units of the circuit. At this point it may be noted that in its other two positions, section A will establish the same ground connection to the remainder of the circuit. Section B, in the second position, becomes inoperative (its wiper on a dead contact). Section C of the selector switch in the second position (and also in its third position) maintains the same connection through conductors 57 and 58 from twelve volt power to the remainder of the circuit, as in the first position.

In the second position of selector switch S203, section B of the switch has opened the connection from manual rheostat R221 to ground, causing the return circuit to manual rheostat R221 to be shifted to a conductor 66 which leads to a wiper No. 1 of a gang relay K201 hereinafter described in detail. In the normal position of that relay shown in FIG. 7, the connection is carried on through a normally closed contact 10 of relay K201 and a conductor 101 to the ultimate control rheostat R218 which is the decay-control rheostat.

In the decay operation, the wiper of decay rheostat R218 starts at minimum resistance position and is gradually moved to maximum resistance position by the turning of shaft 61. It functions to gradually increase the resistance in the power control circuit so as to gradually reduce the output power delivered from the driver amplifier 42 (FIG. 3) and thereby gradually reducing the power of the signal transmitted to the antenna 28. Decay rheostat R218 has a linear change of resistance with respect to the angular displacement of its wiper drive shaft 61, so as to produce an exponential decay change in the transmitted signal. It is operated by a return rotation of shaft 61, in the direction opposite to the operative rotation of rise rheostat R217.

Before completing the description of operation of selector switch S203 in its second position, the remainder of the circuit, which is brought into operation in the second position, will now be described. Conductor 59 carries ground to a pair of indicator lights DS201 and DS202 which are respectively operative to indicate the setting of the apparatus for decay and rise operations. In the operation of the apparatus, where only the decay operation is being utilized, the light DS201 will remain lighted during that cycle of operation. The conductor 59 also places ground on a pair of stepping solenoids B201A and B201B respectively, these solenoids both being coupled through a double pawl and ratchet drive 67 to a worm and pinion gear reduction gear 60, which has a drive connection (e.g. a continuous shaft) schematically indicated at 61, to a pair of cams 62 and 63. The same drive connection, as indicated, extends to the wipers of the two rheostats R217, R218 comprising the ultimate control unit 43. The cams 62 and 63 have respective followers 64 and 65 which are mechanically connected to respective switches S201 (a transfer switch) and S202 (a turn-off switch). Transfer switch S201 and turn-off switch S202 are normally closed, spring-loaded switches which are actuated to their open positions at the ends of respective stages of rise and decay operations by the riding of the respective cam followers 64 and 65 onto the high points of their respective cams 62 and 63. The gearing of the rise and decay solenoid unit includes not only the worm type reduction gear 60 for transmitting rotation to the shaft 61 which actuates the wipers of rheostats R217 and R218 in unison, but also the ratchet mechanism 67 including pawls operated by the armatures of the respective solenoids and operating to transmit rotation in opposite directions to a ratchet wheel which drives the worm of the reduction gearing, all as schematically indicated in FIG. 5.

The remainder of the circuit which is energized when connected to ground through conductor 59 in the second position of selector switch S203, includes a unijunction transistor Q201 which functions at a timer to regulate the intervals between a series of pulses that are transmitted to the stepping decay solenoid B201B (in the decay operation being described), thus regulating the rate at which decay will take place. The timing operation of unijunction Q201 is under the control of a time decay rheostat R219 transmitted through a limiting resistor R201 and timing capacitor C201 (the latter providing a ground connection to conductor 59 to establish a time constant) and from resistor R201 through a conductor 171 to a normally closed contact 17 of relay K201, thence from wiper contact 16 of that relay through a timing control conductor 161 to the emitter of transistor Q201, for varying the time constant so as to adjust the rise and fall rate characteristics.

Operating power for the circuit is brought in from the 28 volt source +28V through a power bus 70 to which the time decay rheostat R219 (and a rise time rheostat R220) are connected as indicated. The power line 70 is continued through a power resistor R202 to base 2 of unijunction Q201. This provides an oscillatory circuit in which unijunction Q201 develops in its output circuit an oscillation which appears in the form of pulses across a resistor R203 in said output circuit. Such output of unijunction Q201 is coupled to the base of a transistor Q202 constituting a portion of a one-shot multivibrator network 71 which also includes a transistor Q203 and network units comprising resistors R204, R206, R207, R208, R209 and R212; capacitors C204 and C205; and also a diode CR201, connected as indicated. Bias for transistor Q202 is established by resistor R206 from ground line 59, and is applied to its base. Bias for the transistor Q203 is developed from voltage transmitted from the 12 volt source through conductor 121, a biasing diode CR202 and a conductor 72; and is established on transistor Q203 by a resistor R212. The multivibrator 71 functions to expand the pulses (of spike form) delivered by unijunction Q201 into square wave-form pulses which are delivered by multivibrator 71 to the base of an amplifier transistor Q204 through a resistor R210. Bias on transistor Q204 is established by a resistor R213 which is connected between its base and the emitter of transistor Q203 through conductor 72. Current flow into transistor Q204 is limited by a resistor R211 connected between its collector and ground. Output voltage on the emitter of transistor Q204 is developed across a resistor R214 and applied to the base of a transistor Q205 which functions as a power switching transistor. Bias for transistor Q205 is developed from conductor 72 by a diode CR204 and is applied to its emitter. The output of power transistor Q205 is transmitted through a pulse output conductor 151 to a wiper 15 of relay K201, thence to a contact 14 of that relay on which wiper 15 is normally closed, thence through a conductor 141 to decay solenoid B201B for conducting power pulses thereto. Inductive decay pulses which might otherwise be developed across solenoid B201B are bled to ground through a diode CR203 and ground connection 59.

In connection with the operation of this circuit on the ground position of selector switch S203, the indicator light DS201 is energized through a conductor 131 reading from a contact 13 on which a wiper 12 of relay K201 is normally closed. Circuit to wiper 12 is completed by a conductor 121 to the 12 volt power supply terminals. During the rise stage of the automatic rise and decay operation, an alternate power-conducting circuit is established from power inlet line 51 to connector line 121 by closing of wiper 7 of relay K201 on its alternate contact 3 (bypassing the power circuit through section C of selector switch S203 also bypassing turn-off switch S202).

In the third position of selector switch S203, providing for a timed rise operation, the connections through sections A and C thereof will remain the same but section B of this switch will provide a connection from ground 55 to a conductor 181 leading to a terminal 18 of relay switch K201 which will thereby be energized to reverse it, placing all of its wipers on its normally open contacts. While parts of relay 201 have previously been referred to, the following detailed description of this relay is given at this point:

Relay K201 is a six-pole double-throw relay having six wipers 6, 7, 1, 12, 16 and 15 respectively (reading from the bottom of FIG. 7) and having active contacts as follows: for wiper 6, a normally open contact 8; for wiper 7, a normally open contact 3; for wiper 1, a normally open contact 9 and a normally closed contact 10; for wiper 12, a normally open contact 11 and a normally closed contact 13; for wiper 16, a normally open contact 4 and a normally closed contact 17; and for wiper 15, a normally open contact 2 and a normally closed contact 14. The energizing coil of relay K201 is connected through a terminal 205 and a conductor 51 to the 12 volt input terminal +12V IN, thus conveying 12 volt current to the relay.

When the relay K201 is energized and its wipers are shifted to the positions alternate to those shown, wiper 15, closing on contact 2 of the relay, will establish a circuit from pulse output conductor 151 through a conductor 21 to rise solenoid B201A so that the output pulses delivered from power transistor Q205 will operate that solenoid instead of the decay solenoid. The closing of wiper 16 of relay K201 on contact 4 will establish a circuit from unijunction output conductor 161 through a conductor 41 and a limiting resistor R215 to the rise time rheostat R220 so as to make that rheostat operational instead of the decay rheostat R219. At the same time, the decay time rheostat R219 has been taken out of the circuitry by the breaking of contact between wiper 16 and its contact 17. The switching of wiper 12 from terminal 11 of relay K201 turns off decay indicator light DS201 and turns on rise indicator light DS202, through conductor 111, now connected to 12 volt power supply through conductor 121. The switching of wiper 1 of relay K201 from its contact 10 to its contact 9 opens the circuit through conductor 101 to decay rheostat R218 (thus removing that rheostat from the circuit) and establishes connection through conductor 91 to the rise rheostat R217 of ultimate control unit 43 thus making that unit operative to control the rise function.

In the rise operation the wiper of rise control rheostat R217 starts at maximum resistance position and is gradually moved (by the turning operation of shaft 61) to minimum resistance position thus gradually increasing the power outlet of driver amplifier 42 from substantially zero output to maximum output with a corresponding increase of the signal transmitted from antenna 29 from minimum to maximum power. The rise control rheostat R217 has an inversely exponential change of resistance with respect to angular displacement of its wiper moving shaft 61 and thus produces a linear rise in the power of the transmitted signal.

Both of the rheostats R217 and R218 operate through approximately 300° of rotation of shaft 61 the rheostat R217 being operational when the shaft is being turned in one direction and the rheostat R218 being operational when the shaft is being turned in the other direction. Selection of one rheostat or the other is made through the selective circuitry hereinbefore described.

In the fourth position of selector switch S203 providing for automatic continuous rise and decay operation section A of the selector switch maintains the same connections as in the second and third position. Section B opens the circuit through conductor 181 to relay K201 thus presetting the circuit to relay K201 for turnnig that relay off at the close of the rise stage of automatic operation. At the same time, a holding circuit to the energizing coil of relay K201 is established from the wiper of section B of the selector switch through its fourth contact to a conductor 84, thence through the transfer switch S201 (which is in its normally closed position during the rise stage) thence through a conductor 81 to the normally open contact 8 of relay K201 upon which its wiper 6 is at that time closed. Thus the relay K201 is maintained in its alternate, energized position until the end of the rise stage of the automatic rise and decay operation.

At the end of the rise stage, the cam follower 64, actuated by the rotation of cam 62, will shift the transfer switch S201 to its open position shown in FIG. 7, opening the circuit through conductor 81 to the energizing coil of relay K201 and causing that relay to be returned (by spring-loading means) to its deenergized position shown in FIG. 7. The holding circuit that has been temporarily set up and maintained during the rise stage of operation, is then opened at contact 8 of relay K201 so that it will not be reestablished at the end of the automatic operation.

With the relay K201 returned to its normal position shown in FIG. 7, the decay operation will proceed in the manner hereinbefore described. In this decay operation, the cams 62 and 63 will be rotated, in return movements, in the direction opposite to that in which they are rotated during the rise operation. The cam follower 64, backing off from the high point of cam 62, will permit the transfer switch S201 to reclose (without effecting the relay K201 since its circuit is now open at contact 8). At the same time the cam 63 will rotate so as to move its follower 65 in the direction for opening the normally closed turn-off switch S202, and at the end of the decay operation, that switch will be opened, breaking the power circuit between power conductor 51 and connecting conductor 121. A capacitor C206, connecting conductor 181 to conductor 84, functions during the automatic rise-decay operation of the unit to provide a current surge in the line 191 to the coil of relay K201 so as to cause the relay K201 to assume the energized position when power is initially applied to the circuit. This capacitor is required in order to energize the relay K201 when the power is turned on with the selector switch S203 preset in the automatic position.

Figure 4:
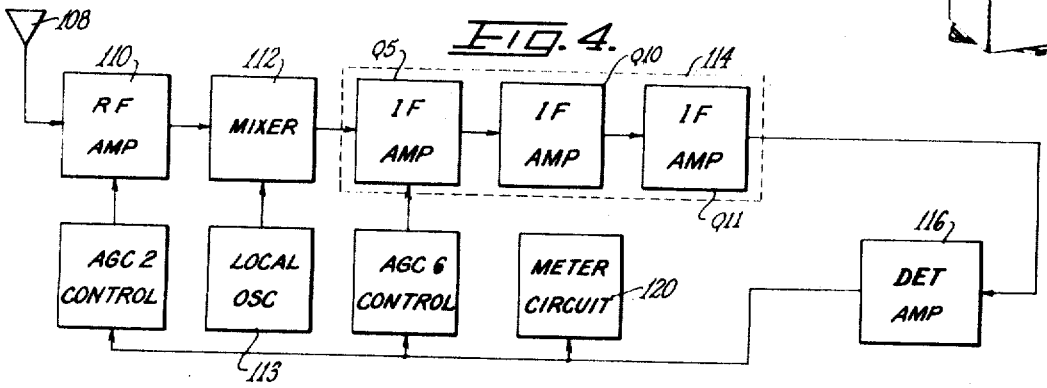
FIG. 4 is a block diagram representative of both the alpha counter and the gamma receiver.
Figure 8:
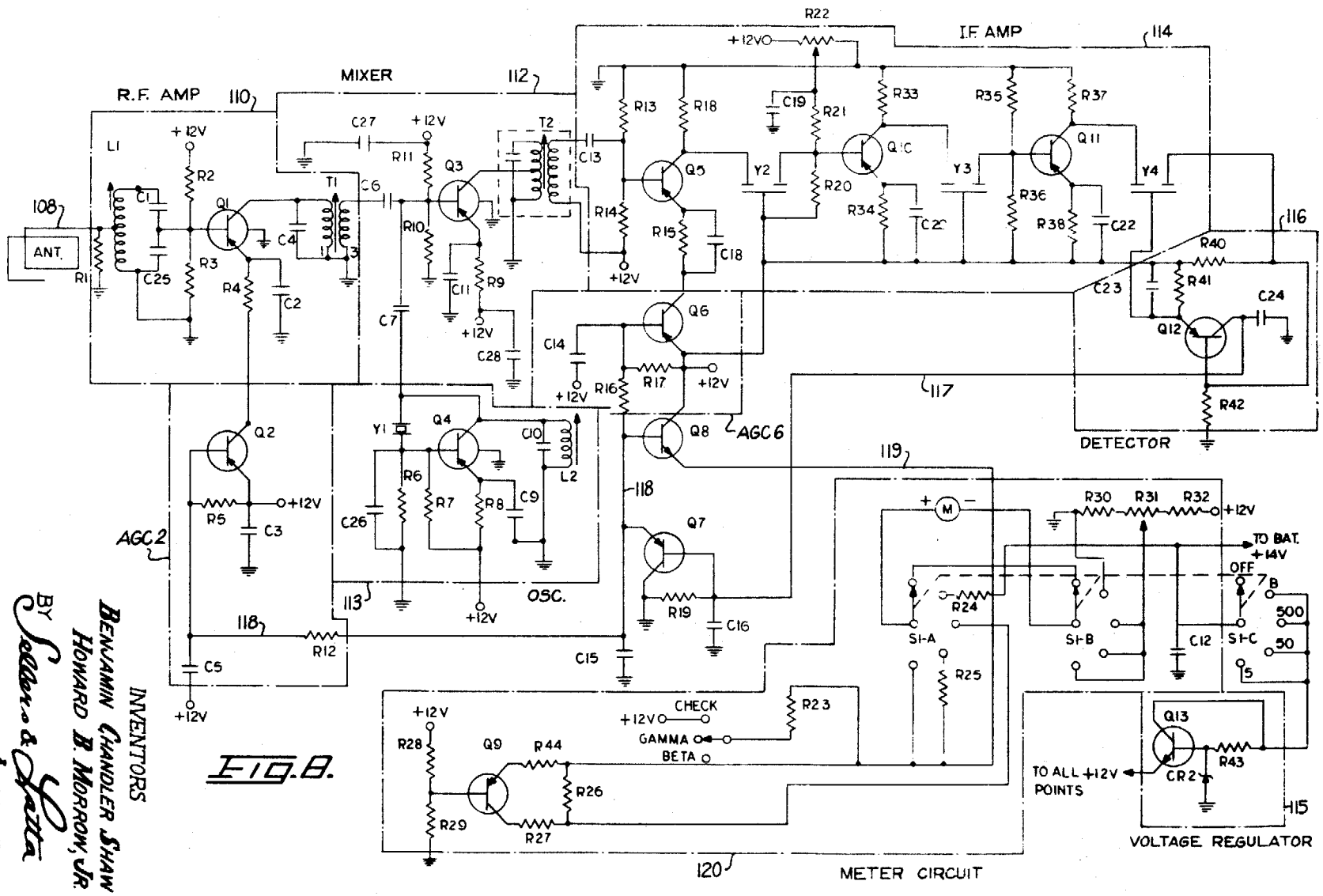
FIG. 8 is a schematic diagram of the electronic mechanism of the receiver units of the apparatus.

The receivers (a simulated gamma ray receiver and a simulated alpha particle counter) can be and preferably are electrically identical but are provided with different housings, one bearing indicia designating gamma ray reception and the other bearing indicia designating alpha particle reception. The housings externally are designed to resemble actual gamma ray and alpha particle detectors so as to make the training operation most effective. Since such detectors are well known, the physical parts of the receivers are not shown. Electrically, each reciver is shown in both FIG. 4 and FIG. 8.

Each receiver comprises an antenna 108, a radio-frequency amplifier 110; a mixer 112; a crystal-controlled oscillator 113; an intermediate frequency amplifier 114; a voltage regulator 115; a detector 116; respective gain controls AGC2 and AGC6; and additional components which will be described in detail hereinafter. Gain control units AGC2 and AGC6 are hereinafter referred to only by reference to transistors Q2 and Q6 (FIG. 8) constituting the principal components thereof. The radio-frequency amplifier, the mixer, the crystal-controlled oscillator and the voltage regulator are of well known conventional circuitry; and the intermediate frequency amplifier is to a large extent of conventional type. The antenna 108 is contained entirely within the casing of the receiver so as to avoid any external projection that would detract from the appearance of a conventional radiation detector. This is accomplished by fabricating the casing largely of molded plastic material, and while some metal parts (e.g., hinges, fasteners, etc., switch mounts and switches, etc.) are embodied in or mounted directly on or in the casing, such metal parts are connected into the antenna circuit so as to avoid weakening the received signal.

The radio frequency amplifier 110, briefly described, comprises a coil L1, impedance-matching capacitors C1 and C25 coupled to the coil to provide a resonant circuit, loaded by a resistor R1 and connected to the base of a transistor Q1 biased by resistors R2 and R3 from a 12 volt voltage source +12V; transistor Q1 having a collector circuit comprising a transformed T1 and its capacitor C4 forming a resonant circuit, and having an emitter-biasing circuit comprising resistor R4 and bypass capacitor C2. The output of transformer T1 is delivered through a capacitor C6 to the mixer.

The mixer 112 comprises a transistor Q3 biased by resistors R10, R11 from the 12 volt source +12V, which is bypassed at this point by capacitor C27. Local oscillations are fed to the base of transistor Q3 through a coupling capacitor C7. The collector circuit of transistor Q3 comprises an intermediate frequency transformer T2. Its emitter biasing circuit comprises capacitor C11, resistor R9 in connection to the 12 volt supply +12V, and a bypass capacitor C28.

Oscillator 113 comprises a transistor Q4 having its base biased by resistors R6, R7, an emitter biasing circuit comprising resistor R8 connected to the 12V voltage source, and a bypass capacitor C9; and an oscillatory collector circuit comprising a capacitor C10 and an adjustable coil L2. Feedback for the oscillator is provided by a piezo-electric crystal Y1 and a capacitor C26.

Intermediate frequency amplifier 114 comprises a transistor Q5 base-biased by resistors R13, R14 and a connection of the latter to the 12 volt source; an input connection through a coupling capacitor C13 to receive the signal output of the mixer 112; a resistor R15 and capacitor C18 biasing the emitter; a connection to ground through resistor R18 to provide power on its collector; and a piezo-electric resonant coupling unit Y2 coupling its output signal to the base of a transistor Q10. Transistor Q10 is base-biased by resistors R20 and R21 (bypassed by capacitor C19) and a potentiometer R22 connected to the 12 volt source. Emitter bias is provided by a resistor R34 and a capacitor C20. Collector output is delivered through a piezo-electric resonant coupling unit Y3 to the base of a transistor Q11. Power for the collector current is delivered through a resistor R33.

Transistor Q11 is base-biased through resistors R35 and R36 and is emitter-biased by a resistor R38 and a capacitor C22. Its collector current is energized by connection to ground through resistor R37 and is coupled through a piezo-electric resonant coupling Y4 to the base of a transistor Q12.

Voltage regulator 115 is comprised of a transistor Q13 energized by a connection to a battery indicated at +14V, through a switch S1–C when in one of its selective "on" positions indicated at 5, 50 and 500 (designating roentgens of radiation) and B (a battery-test position). A base voltage is established through a Zener diode CR2 and a resistor R43. Its emitter voltage is the differential between the battery voltage and the voltage of the Zener diode, nominally 12 volts, and is transmitted to the various points in the circuit where the 12V voltage is required.

Detector 116 comprises a transistor Q12 base-biased by resistors R40, R42, and emitter-biased by resistor R41 and capacitor C23 to operate as a square-law detector (its output varying as the square of its input). Its collector is bypassed by a large capacitor C24 to remove any short-term variations in the collector voltage. The smoothed collector voltage is connected to the base of transistor Q7 (an emitter-follower) by a conductor 117. A resistor R19, bypassed by a capacitor C16, provides operating current for the base of transistor Q7 and the collector of transistor Q12. The emitter output of transistor Q7 is fed through a conductor 118, bypassed by a capacitor C15, to the base of a transistor Q2 through a resistor R12. The base of transistor Q2 is biased through a resistor R5 and bypassed through a capacitor C5. The emitter of transistor Q2 is bypassed by capacitor C3.

The collector of transistor Q2 feeds its current to the emitter of transistor Q1 through a resistor R4, in inverse relation to the signal output of transistor Q12. This relationship causes the gain in transistor Q1 to vary in a manner to oppose any change in the signal received from the antenna 108. It functions as an automatic gain control which provides for stable operation of the meter circuit hereinafter described. Supplementary gain control is provided for by a transistor Q6 which receives the signal from conductor 118 through a resistor R16 and is base-biased by a resistor R17 and a capacitor C14. Collector current output of transistor Q6 is fed through a resistor R15 and a capacitor C18 to the emitter of the transistor Q5 in the manner previously described for the output of transistor Q2 to the emitter of transistor Q1.

Transistor Q8 is an emitter- follower which receives a signal from conductor 118 and develops an emitter current which is transmitted through a conductor 119 to a meter circuit 120.

Meter circuit 120 includes, in general, two sections (A and B) of a switch S1, a meter M, a boost-amplifier transistor Q9, a switch S2, and a zero-setting potentiometer R–31. Switch S1–C, hereinbefore mentioned, is a third section of the switch S1, the three sections having a common operator as indicated. Potentiometer R31 functions to adjust the voltage on a conductor 122 to equal the residual voltages in the remainder of the circuit which appear on conductor 119 when no signal is being received. Operating current is fed to the potentiometer through resistors R30 and R32.

In the five positions of switch S1 as designated on section C thereof, section S1–A provides a connection from conductor 119 to meter M, which then operates to provide an indication of the difference between the signal potential on conductor 119 and the potential on conductor 112. The circuit to meter M is completed by a connection to the wiper of section B of switch S1, as shown. In the 50 position of switch S1, section A connects a resistance R25 into the circuit of meter M, in order that the meter may read at voltage levels higher than its direct reading range.

In the 500 position of switch S1, section A provides a connection 123 between meter M and resistors R26 and R27 associated with transistor Q9. Resistor R26 functions to maintain the meter M within its operating range so long as the voltage on conductor 119 is below a value established on the base of transistor Q9 by a voltage divider comprising resistors R28 and R29. When the voltage on conductor 19 exceeds that valve, current flow is established to a resistor R44 to the emitter of transistor Q9 and, through transistor action, through its collector and resistor R27. This action serves to increase the meter readings at high signal levels to give a closer relationship between the meter readings and the signal received on the antenna.

Switch S2 has three positions as designated, and is spring-loaded on the GAMMA middle position. In this position, and in the BETA position, the switch has no effect on the remainder of the circuit. In the CHECK position, it connects the voltage source 12V through a resistor R23 to conductor 119, thus placing 12 volts on meter M through resistor R23 and causing the indicated voltage to rise in a manner to simulate the action of a small radiation check source provided in an operational radiation detecting instrument.

When switch S1 is in the B position, section A thereof provides a direct connection through a resistor R24 to battery, the circuit being completed by a connection 124 to ground through section B of the switch. Thus the meter M becomes a voltmeter directly reading the voltage of the battery.

A capacitor C12 provides a bypass from battery to ground so as to eliminate any internal noise voltages generated in the battery.

Figure 6:
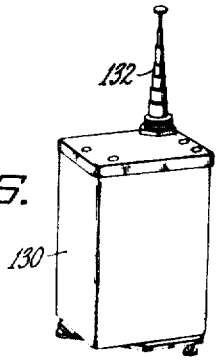
FIG. 6 is a perspective view of the "hot-spot" transmitter.

The hot-spot transmitter (FIG. 6) is a small, portable, self-contained, low power radio transmitter contained within a case 130 and having an extensible sectional whip antenna 132. By suitably locating the unit, it can be used to simulate an area of high local nuclear contamination. It is more suitable for indoor training use than is the main transmitter. It is used to provide the simulated alpha-particle field that is detected by the alpha receiver, and may also be used to radiate to the gamma receiver. A switch (not shown) on the bottom section of antenna 132 is operative to turn on the unit when the bottom section is extended, and to turn off the unit when the antenna is fully retracted. The hot-spot transmitter comprises circuitry generally similar to the oscillator 40 and driver 42 of the main transmitter.

Operation of the apparatus may involve the use of the main transmitter for simulating rise or decay or rise and decay radiation, with or without supplementary transmission from the "hot-spot" transmitter, coupled with the use of one or more of the gamma ray-simulating receivers by personnel in training, to examine the signal strength in various portions of the area in which the transmitted signal can be received; supplemented by the use of the alpha receiver in the "hot-spot" areas of more localized transmission from the hot-spot transmitter. It should be noted that the signals radiated by the main transmitter and by the hot-spot transmitter are of the same character but may vary as to their transmission range. The signal strength of the hot-spot transmitter is not varied. The signal strength of the main transmitter may be adjusted manually by placing selected switch S203 in its first position as hereinbefore described; or may be varied with a linear rise effect by placing the selector switch on its second position; or may be varied in an exponential decay operation by placing the selector switch on its third position; or may be caused to cycle uninterruptedly through a rise stage and then through a decay stage by placing the selector switch on its fourth position.

In the operation of the main transmitter, the crystal-controlled oscillator 40, operating at the output frequency, feeds the buffer/driver stage 42 which drives the amplifier 45 to an output of up to five watts into a 50 ohm load. The lowpass filter 49 inserted between the transmitter and load greatly attenuates any second and higher order harmonics that may be present in the transmitter output. The main 12 volt power bus feeding the various main transmitter assemblies is controlled by the rise and decay unit 24, allowing the shutoff of all power automatically at the completion of an exercise. The rise and decay unit 24 also controls the transmitter output power by varying the emitter resistance of the driver stage transistor (not shown). The rate and direction (increase or decrease) of power change is dictated by settings on rise and decay front panel controls (not shown). The power supply unit 25 is a D.C.-to-D.C. converter which supplies 28 volts to the power amplifier through the coder. When the coder is activated, it shunts out any rise and decay unit-controlled resistance in the driver stage emitter circuit during transmit intervals, thus causing the transmitter to operate at maximum power. During off intervals, such as spaces in the transmitted code sequence, the 28 volt supply to the power amplifier 45 is interrupted, reducing the transmitter output to essentially zero. At the completion of an identification cycle (three transmissions of the identifying code), the coder automatically removes the emitter resistance short in the driver stage, returning the transmitter power to the level dictated by the automatic rise and/or decay program.

The rise and decay unit controls the D.C. resistance in an emitter circuit in the R.F. deck 40, 42, 45 by the series combination of the manual control R221, and either the rise potentiometer, R218, or the decay potentiometer, R217, depending upon the position of the selector switch, S203, and relay K201. When the selector switch is in the manual position, only R221 controls output power. The positions of R217 and R218 are established as a function of time by a bidirectional stepper motor which is geared to the potentiometer shaft by a worm-drive system such that 2500 steps are required to rotate the potentiometers through their full travel. Timing periods for the stepper are established by unijunction transistor Q201, operating as a relaxation oscillator with the period determined by an RC time constant. In the rise function, the time constant is established by C202 and R215 in series with the rise time potentiometer R220. In the decay cycle, the time constant is determined by the network consisting of C202, C201, R201 and the decay time control R219. The timing pulse from Q201 is coupled to the one-shot multivibrator, Q202 and Q203, which determines the duration of the pulse applied to the stepper. The pulse from the one-shot is amplified by Q203 and Q205 and applied to the rise stepper solenoid or decay stepper solenoid as selected by relay K201. In the auto position of the selector switch, transfer switch S201 is opened by a cam on the auto rise and decay potentiometer shaft at the maximum power point, causing K201, previously energized, to drop out and begin the decay cycle. At the end of the decay cycle, "turn off" switch S202 interrupts power to the entire main transmitter. Lamps DS201, DS202 and DS203 indicate the mode of operation of the system—decay, rise or manual, respectively. The drive to the automatic rise and decay potentiometer shaft is applied through a slip clutch, so that the system can be manually overridden at any time.

We claim:

1. In a radiation survey training apparatus: means for transmitting radio signals simulating the emission from a nuclear blast fallout, comprising an antenna including a vertical radiator, a plurality of angularly spaced horizontal radials disposed in a plane at right angles to said radiator; and a plurality of radials disposed in a sector diametrically opposite said horizontal radials and inclined downwardly so as to subtend an obtuse angle with said radiator, whereby to radiate said signals over an area having an oval configuration simulating a nuclear fallout pattern.

2. Radiation survey training apparatus comprising: a radio transmitter including means to generate a continuous succession of radio frequency oscillations for development into transmitted radio signals; means for amplifying said oscillations; a rise and decay control unit operable to vary the signal strength of said oscillations in respective stages of rising and decaying signal strength simulating the rise and decay of nuclear fallout emission; a selector for selectively operating said rise and decay unit so as to confine the operation of the apparatus to either a rise stage or a decay stage of operation; said apparatus further including, in said selector, means for effecting successive stages of rise and decay operation; and means in said rise and decay control unit to effect automatic transition from the rise stage to the decay stage.

3. Apparatus as defined in claim 2, wherein said rise and decay control unit is operable on said amplifying means.

4. Radiation survey training apparatus comprising: a radio transmitter including means to generate a continuous succession of radio frequency oscillations; an amplifier for amplifying said oscillations; means responsive to the amplified oscillations to transmit radio signals adapted for reception by a radio receiver in a manner to simulate nuclear radiation detection; and control means automatically operable for varying the strength of the transmitted signals, comprising a pulse-responsive stepper motor, pulse generating means for actuating said motor, and means driven by said motor to vary the power level in said amplifier.

5. Apparatus as defined in claim 4, wherein said amplifier comprises a driver stage and a power stage; and wherein said control means comprises a variable resistor exerting a control effect on said driver stage.

6. Radiation survey training apparatus comprising: a radio transmitter including means to generate a continuous succession of radio frequency oscillations for development into transmitted radio signals; an amplifier for amplifying said oscillations; and a rise and decay control unit operable to vary the signal strength of said oscillations in respective stages of rising and decaying signal strength simulating the rise and decay of nuclear fallout emission, said control unit comprising a reversibly operable stepping motor; pulse-generating means for actuating said stepping motor; ultimate control means driven by said stepper motor for varying the power level in said amplifier, comprising a rise-control variable resistor having a resistance value varying in inverse exponential ratio to the extent of rise displacement of said motor so as to provide a linear rise rate and a decay-control variable resistor having a resistance value varying linearly with reference to said extent of displacement of said motor so as to provide an exponential decay rate; and switching means actuated by said motor for operating said motor in one direction and for activating said rise-control resistor during one stage of operation, and for operating said motor in reverse direction and for activating said decay-control resistor during a subsequent stage of operation.

7. Radiation survey training apparatus comprising: a radio transmitter including means to generate a continuous succession of radio frequency oscillations; means responsive to said oscillations to transmit radio signals adapted for reception by a radio receiver in a manner to simulate nuclear radiation detection; means for effecting rise and decay variations of signal strength; a coder operable to periodically override the control effect of said rise and decay means and to superimpose interruptions on the transmission of said signals such as to convert the same into a code signal.

8. Apparatus as defined in claim 7, wherein said coder includes means to disable said rise and decay unit so as to adjust the strength of the transmitted code signals to the maximum for which the transmitter is set.

9. Radiation survey training apparatus comprising: a radio transmitter including means to generate a continuous succession of radio frequency oscillations; means responsive to said oscillations to transmit radio signals adapted for reception by a radio receiver in a manner to simulate nuclear radiation detection; means for effecting rise and decay variations of signal strength, comprising a reversible servomotor, respective rise and decay control devices driven in opposite directions by said servomotor and operative to vary the electrical conditions in said transmitter so as to effect respective rise and decay of signal strength, and a transfer switch actuated by said servomotor at the end of the rise stage of operation to disable said rise control device and to activate said decay control device.

10. Apparatus as defined in claim 9, further including a double-throw, multiple-pole relay operating under the control of said transfer switch to effect a plurality of circuit changes in said rise and decay means for automatic transfer from the rise stage to the decay stage of operation, and a turnoff switch actuated by said servomotor to terminate a cycle of automatic operation at the end of a decay cycle thereof.

11. Apparatus as defined in claim 10, including a manual control device and a four-position selector switch in said rise and decay means, for selectively operating the same (1) by manual control or (2) in a half-cycle rise stage terminated automatically by said turnoff switch or (3) in a half-cycle decay stage similarly terminated or (4) in a full cycle operation including said rise and decay stages joined by operation of said transfer switch and terminated by said turnoff switch.

*12. Radiation survey training apparatus comprising: a radio transmitter including means to generate a continuous succession of radio frequency oscillations in transmitted radio signals; a rise and decay control unit operable to vary the signal strength of said oscillations in respective stages of rising and decaying signal strength simulating the intensity of nuclear radiation levels during rise and decay of nuclear fallout emission; and selector means for selectively operating said rise and decay unit to enable operation of the apparatus to provide output transmission as well as to confine the operation of the apparatus to simulate either a rise or a decay of fallout emission.*

*13. Radiation survey training apparatus as defined in claim 12, wherein means are provided enabling automatic transition of said control unit from the rise stage to the decay stage.*

*14. Radiation survey training apparatus comprising: a radio transmitter including means to generate a continuous succession of radio frequency oscillations in transmitted radio signals; and a rise and decay control unit operable to vary the signal strength of said oscillations in respective stages of rising and decaying signal strength simulating the rise and decay of nuclear fallout emission; said apparatus further including selectively operable means for enabling successive stages of rise and decay operation.*

*15. Radiation survey training apparatus as defined in claim 14, wherein means in said selectively operable means enables selective operation of the apparatus to provide output transmission simulating either a rise or a decay of fallout emission.*

*16. Radiation survey training apparatus comprising: a radio transmitter including means to generate a continuous succession of radio frequency oscillations; means responsive to the oscillations to transmit radio signals adapted for reception by a radio receiver in a manner to simulate nuclear radiation detection; and control means automatically operable for varying the strength of the transmitted signals, comprising a pulse-responsive device, a pulse generating means for actuating said pulse-responsive device, and means driven by said device to vary the power level in said amplifier.*

*17. Radiation survey training apparatus comprising: a radio transmitter including means to generate a continuous succession of radio frequnecy oscillations; means responsive to said oscillations to transmit radio signals adapted for reception by a radio receiver in a manner to simulate nuclear radiation detection; means for effecting rise and decay variations of signal strength; and means for interrupting transmission of rise and decay variations of signal strength and instead controlling radio signal transmission to provide a coded signal transmission.*

*18. A method of training in nuclear fallout radiation*

*survey comprising the steps of: simulating, by radio transmission, radio signal emissions representative of progressively rising and progressively decaying stages of nuclear fallout emission; directing such radio signal emissions in a pattern representative of nuclear fallout emission; and surveying said radio signal by using radio receivers simulating radiacmeters and alpha counters to provide a survey representative of emission from nuclear fallout gamma particles and of alpha rays.*

*19. A method of training in radiation survey as defined in claim 18 further comprising the steps of generating a predetermined rising signal emission simulating rise in fallout emission followed automatcally by a predetermined decreasing signal emission simulating decay in fallout emission.*

*20. A method of training in radiation survey as defined in claim 18 further comprising the steps of providing, by auxiliary "hot spot" radio transmissions from predetermined locations, radio signal emissions representative of high nuclear radiation auxiliary to the simulated fallout patterns.*

*21. A method of training in radiation survey as defined in claim 18 further comprising the step of interrupting the radio signal emission, which simulates fallout emission, and imparting via said radio transmission a predetermined coded radio signal transmission to identify the simulated fallout transmission.*

References Cited

The following references, cited by the Examiner, are of record in the patented file of this patent or the original patent.

Radio Engineering Handbook, Henney, McGraw-Hill, N.Y., 1959 Edition, Chapter 18, pp. 58–60.

WILLIAM H. GRIEB, Primary Examiner

U.S. Cl. X.R.

325—67; 343—846

UNITED STATES PATENT OFFICE

CERTIFICATE OF CORRECTION

Patent No. Reissue No. 27,078 Dated March 2, 1971

Inventor(s) B. C. Shaw and Howard B. Morrow, Jr.

It is certified that error appears in the above-identified patent and that said Letters Patent are hereby corrected as shown below:

Column 3, line 58, change "if" to -- of --.

Column 8, line 15, insert a comma (,) after operation.

Column 14, line 62, delete "a" at the beginning of line.

Column 15, line 9, "particles" should be -- rays -- and "rays" should be -- particles --.

Signed and sealed this 27th day of July 1971.

(SEAL)
Attest:

EDWARD M.FLETCHER,JR.
Attesting Officer

WILLIAM E. SCHUYLER, JR.
Commissioner of Patents

USCOMM-DC 60376-P69
U.S. GOVERNMENT PRINTING OFFICE : 1969 O—366-334